(12) United States Patent
Zaitsev et al.

(10) Patent No.: US 9,101,852 B2
(45) Date of Patent: Aug. 11, 2015

(54) FLUID INLET APPARATUS

(75) Inventors: Nikolay Zaitsev, Moscow (RU);
Aleksandra Zaytseva, legal representative, Moscow (RU); Ansor Gäbler, Constance (DE)

(73) Assignee: Sulzer Chemtech AG, Winterthur (CH)

(*) Notice: Subject to any disclaimer, the term of this patent is extended or adjusted under 35 U.S.C. 154(b) by 164 days.

(21) Appl. No.: 12/927,705

(22) Filed: Nov. 22, 2010

(65) Prior Publication Data

US 2011/0120592 A1    May 26, 2011

(30) Foreign Application Priority Data

Nov. 24, 2009  (EP) .................................... 09176896

(51) Int. Cl.
*B01D 45/12*  (2006.01)
*B01D 3/00*  (2006.01)

(52) U.S. Cl.
CPC .................................... *B01D 3/008* (2013.01)

(58) Field of Classification Search
USPC ........ 55/459.1, 345, 348, 349, 434, 447, 456, 55/462; 96/301, 302, 304, 305, 321
See application file for complete search history.

(56) References Cited

U.S. PATENT DOCUMENTS

2005/0189663 A1    9/2005   Dollie et al.
2009/0139192 A1    6/2009   Sams et al.

FOREIGN PATENT DOCUMENTS

DE         295 01 148 U1     7/1995

*Primary Examiner* — In Suk Bullock
*Assistant Examiner* — Dung H Bui
(74) *Attorney, Agent, or Firm* — Francis C. Hand; Cecchi, Byrne, et al

(57) ABSTRACT

An apparatus for the introduction and for the distribution of a fluid into an inner space of a container includes an inlet passage and a distribution passage, wherein the inlet passage opens into the distribution passage so that the fluid can be guided from the inlet passage into the distribution passage. The distribution passage has a jacket which has at least one outlet opening. The inlet passage is connected to the distribution passage via at least one opening which is arranged in the jacket of the distribution passage.

15 Claims, 6 Drawing Sheets

(A-A)

FLUID INLET APPARATUS

The invention relates to a fluid inlet apparatus. More particularly, this invention relates to a fluid inlet apparatus for the introduction and distribution of a fluid, in particular of a gas containing a liquid, into a container. Still more particularly, this invention relates to a method of distributing a fluid within a mass transfer device.

The container can be made as a device or as a separation device. The invention also relates to a container having such an apparatus.

The simplest possibility of introducing a fluid into a container is to employ an inlet stub which is attached to a container wall. Where the fluid is a gas which contains a liquid finely distributed in droplet form; however, the distribution of the fluid in the container can not be influenced downstream of the inlet stub. Thus, the fluid is not distributed evenly in the inner space of the container.

A fluid inlet apparatus having an improved distribution of the fluid is known, for example, from WO06122940. The apparatus includes a vertical passage which adjoins the inlet stub and which extends substantially over the total diameter of the container. This distribution passage has a plurality of guide plates. Each of the guide plates registers one part flow each of the first fluid and deflects the first fluid substantially by 90°. The fluid is hereby introduced into the container on the left hand side and on the right hand side of the container. At the same time, a separation of liquid takes place from the fluid which leaves the guide plates as a gas with a portion of residual liquid.

The gas flows through the container and arrives at a contact surface in which gas and residual liquid are separated due to their differing densities. The liquid is separated at the contact surface while the gas flows through the contact surface. The contact surface can, for example, be made as a knitted separator.

The apparatus in accordance with WO06122940 represents an improvement with respect to the inlet stub because the gas is distributed more evenly in the container. It has, however, been found that the separation of the liquid takes place in an unsatisfactory manner and liquid is taken along into the part of the container arranged downstream of the contact surface.

It has moreover been found that a cross-sectional surface of the container downstream of the apparatus in accordance with WO06122940 has two respective regions in which the flow speed of the gas is greater than in the remaining part of the cross-sectional surface.

This means that the apparatus in accordance with WO06122940 admittedly represents an improvement with respect to a conventional inlet stub at the container wall, but has still proved to be unsatisfactory since a non-even distribution of the gas in the container, a so-called maldistribution, is still present and liquid is taken along into the part of the container located downstream of the apparatus.

It is therefore the object of the invention to provide an apparatus for the distribution of a fluid in a container by means of which an improved separation of the fluid into a gas and into a liquid takes place and an even distribution of the gas in the container can be achieved.

Briefly, the invention provides an apparatus for the introduction and for the distribution of a fluid containing gas and liquid into an inner space of a container including an inlet passage for conveying a fluid and at least one distribution passage for receiving fluid from the inlet passage. The distribution passage has at least one inlet opening communicating with the inlet passage to receive a flow of fluid therefrom and at least one outlet opening for an outflow of gas separated from the flow of fluid. The inlet opening is disposed to direct the flow of fluid tangentially to the inlet opening to generate a rotational flow of the flow of fluid in the inner space of the distribution passage.

The distribution passage is advantageously made as a tube element, with the tube element in particular having a rotationally symmetrical cross-section, preferably a circular cross-section. The inlet opening is arranged in the jacket which is in particular a tube jacket of the distribution passage formed as a tube element, thus the fluid flows tangentially with respect to the tube jacket through the opening.

The fluid is, in particular, a compressible fluid, typically a gas which contains a liquid which is distributed in the gas in droplet form. The gas is thus directed, coming from the inlet passage, through the opening into at least one distribution passage, preferably into a plurality of distribution passages. The distribution passage includes an angle of greater than 0° and less than 180° to the inlet passage, in particular an angle of greater than 60° and less than 120°, to the inlet passage. In accordance with a particularly preferred embodiment, the angle between the inlet passage and the distribution passage amounts to approximately 90°.

What is important is the differing arrangement of the opening in the distribution passage in comparison with the prior art. The opening can in particular be arranged in the upper half and/or lower half of the jacket. The flow toward the distribution passage is hereby tangential. This has the advantage that a part flow can be branched off to a following distribution passage, on the one hand, and the fluid enters through the opening into the distribution passage tangentially, on the other hand. In this respect, "tangential" means that the fluid flows through the opening substantially parallel to the tangent at the point of the distribution passage closest to the top or to the base of the inlet passage. If the fluid is in the distribution passage, the fluid is diverted by the inner wall of the distribution passage. The fluid is hereby set into rotation and the droplets of the liquid in the gas are accelerated toward the tube wall and are then separated at the inner side of the jacket and led off through a liquid collection element. The effectiveness of the separation of the liquid from the gas is in this respect increased by a more intensive contact with the inner wall of the distribution passage. The liquid is thus already separated and led off before the inlet into the container and thus does not reach the main flow of the gas. According to a preferred embodiment, a plurality of openings is arranged in particular in the upper half of the jacket; according to a particularly preferred embodiment there are two openings arranged in the upper half of the jacket.

The opening can furthermore have a guide element. The guide element is in particular made as a tab which is stamped out of the wall of the distribution passage and is subsequently bent over. Alternatively or in addition to this, a plurality of guide elements can also be provided. The guide element can project into the interior of the distribution passage, but can also extend outside the distribution passage in the direction of the fluid inlet. The guide element can, in particular, project in the direction of the inner space of the distribution passage and at the edge of the opening, which is reached first by the fluid flow and can be orientated upstream at the edge of the opening which is registered last by the fluid flow. An inflow passage can hereby be formed to give the fluid a more exactly defined flow direction so that fewer boundary vortices are produced in the rotational flow which can have a disadvantageous effect on the separation of the liquid. The guide elements can also be welded separately to the tube element forming the distribution passage.

A liquid collection element is advantageously provided which can be the inlet passage itself or a passage piece which is located at the wall of the distribution passage or of the distribution element and which is connected to a liquid outlet opening in the wall of the distribution passage or of the distribution element. Liquid separated at the inner wall of the jacket can be led away to the outside of the jacket of the distribution element or of the distribution passage by means of the liquid collection element. The liquid collection element can contain at least one hole, which is foreseen for the discharge of the liquid.

A preseparation element can be arranged in the environment of the liquid collection element or upstream of the liquid collection element. The liquid separation can be further improved by means of the preseparation element. If the preseparation element is made as a structure containing hollow spaces, such as a screen, knitted material, woven material or felt, droplets can be caught in the structure, can coalesce there and can be guided in the direction of the liquid outlet opening. Alternatively to this, the preseparation element can be made as a blocking element on which the fluid impacts and undergoes a forced deflection. The blocking element can also have a restriction effect. The blocking element can furthermore be arranged such that the separated liquid is guided directly to the liquid outlet opening. The smaller the length of the opening with an unchanged width of the opening, the more pronounced the rotational flow since the path length from the opening up to the outlet opening increases with a shorter opening and the number of the rotational procedures is higher until the fluid arrives at the outlet opening. The opening can, in particular, be made as a slit, with the spacing between the first slit end and the second slit end of the opening being a length of the opening. The spacing between a first wall and a second wall of the opening is the opening width. The first wall and the second wall in this respect extend between the first and second slit ends.

A distribution element can adjoin the distribution passage in accordance with a preferred embodiment, with the distribution passage and the distribution element being connected via the discharge opening so that the fluid can be guided from the distribution passage into the distribution element.

The distribution element has a jacket, with a breakthrough being provided in the jacket through which the fluid can be directed into the inner space of the container. The breakthrough is arranged at the distribution element such that the flow of the gas substantially takes place in the direction of the longitudinal axis of the container. This means that the gas separated from the liquid exits the breakthroughs, which can in particular be designed as slit-like openings, in the direction of the longitudinal axis of the container. In particular the distribution element can be configured as a tube element.

The jacket of the distribution element has a first jacket end and a second jacket end so that the jacket extends between the first and the second jacket ends. The jacket can be guided through the inlet passage so that the jacket forms the distribution passage within the inlet element. Alternatively to this, the distribution element can be guided through the distribution passage and can contain a cut-out in the interior of the distribution passage. Alternatively to this, the first jacket end of the distribution element can adjoin the distribution passage or project into the distribution passage.

The breakthrough can be made as a slit which has a longitudinal dimension which extends between the first end and the second end of the slit. A first wall and a second wall extend between the first and second ends of the slit. The average spacing between the first wall and the second wall of the slit is the slit width. The longitudinal dimension is at least twice as big, preferably three times as big, particularly preferably at least five times as big as the slit width, so that a distribution of the gas is achieved which is as even as possible with respect to the cross-sectional surface of the container.

The opening width of the opening in the distribution passage is preferably larger than the slit width of the breakthrough, in particular when the longitudinal dimension of the breakthrough is larger than the width of the opening or if a plurality of breakthroughs are provided next to one another.

The apparatus is advantageously used in accordance with any one of the preceding embodiments in a separation device or in a mass transfer device.

The invention also provides a method for the distribution of a fluid in the inner space of a mass transfer device employing an above-described apparatus. To this end, the method includes the following steps: guiding the fluid through the inlet passage into the distribution passage and a plurality of distribution elements; deflecting the fluid from the distribution passage into the distribution elements; discharging the fluid through at least one respective slit-like opening each of the distribution element into the inner space of the mass transfer device, wherein the slit-like opening is arranged such that the flow direction of the first fluid is substantially parallel to the longitudinal axis of the container.

These and other objects and advantages of the invention will become more apparent from the following detailed description taken in conjunction with the accompanying drawings wherein:

FIG. 7b illustrates a section along the line A-A of the apparatus in accordance with FIG. 7a;

FIG. 8b illustrates a section along the line A-A of the apparatus in accordance with FIG. 8a.

Figure 1:
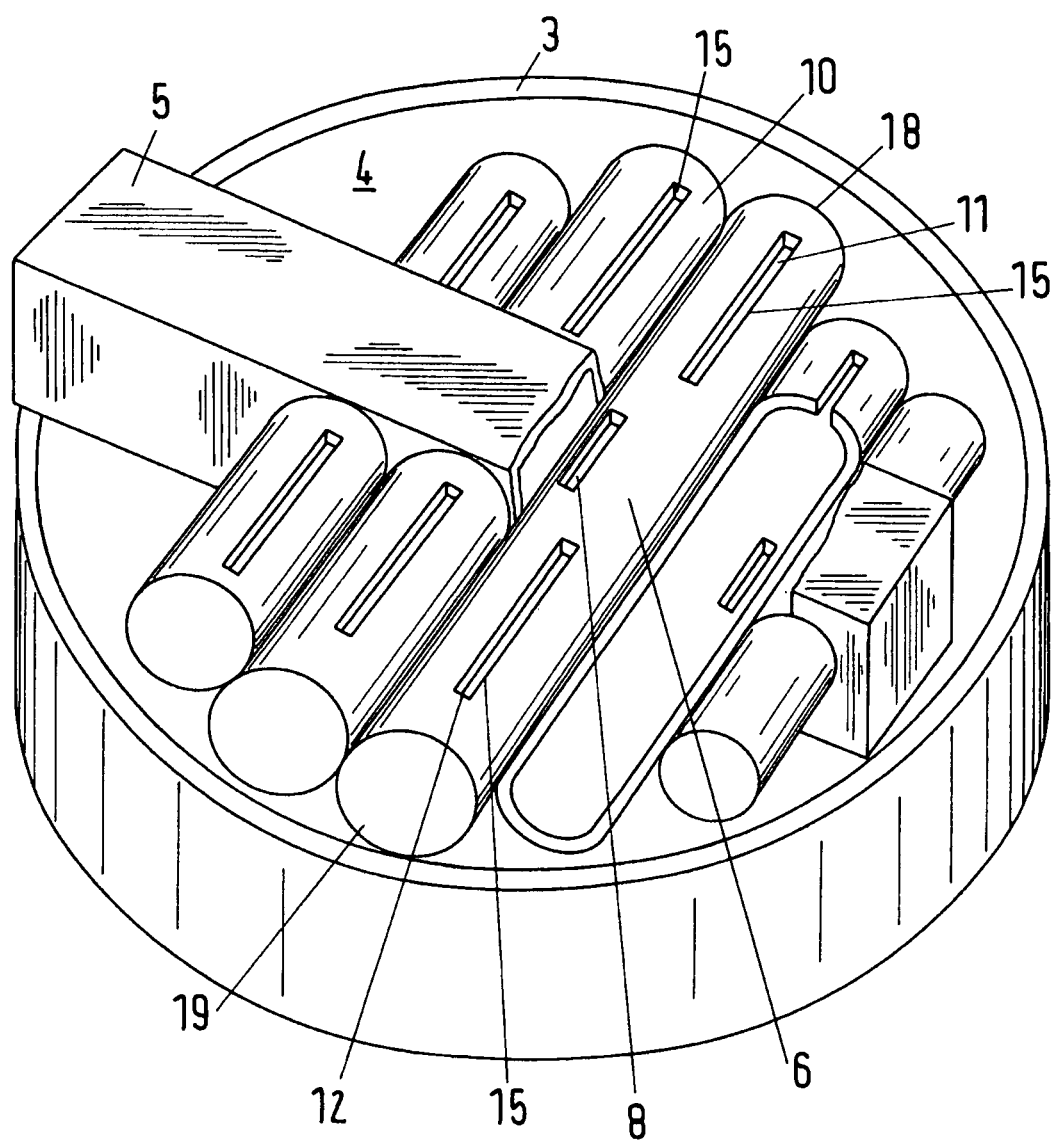
FIG. 1 illustrates a view of a fluid inlet apparatus in accordance with the invention in a container.
Figure 2:
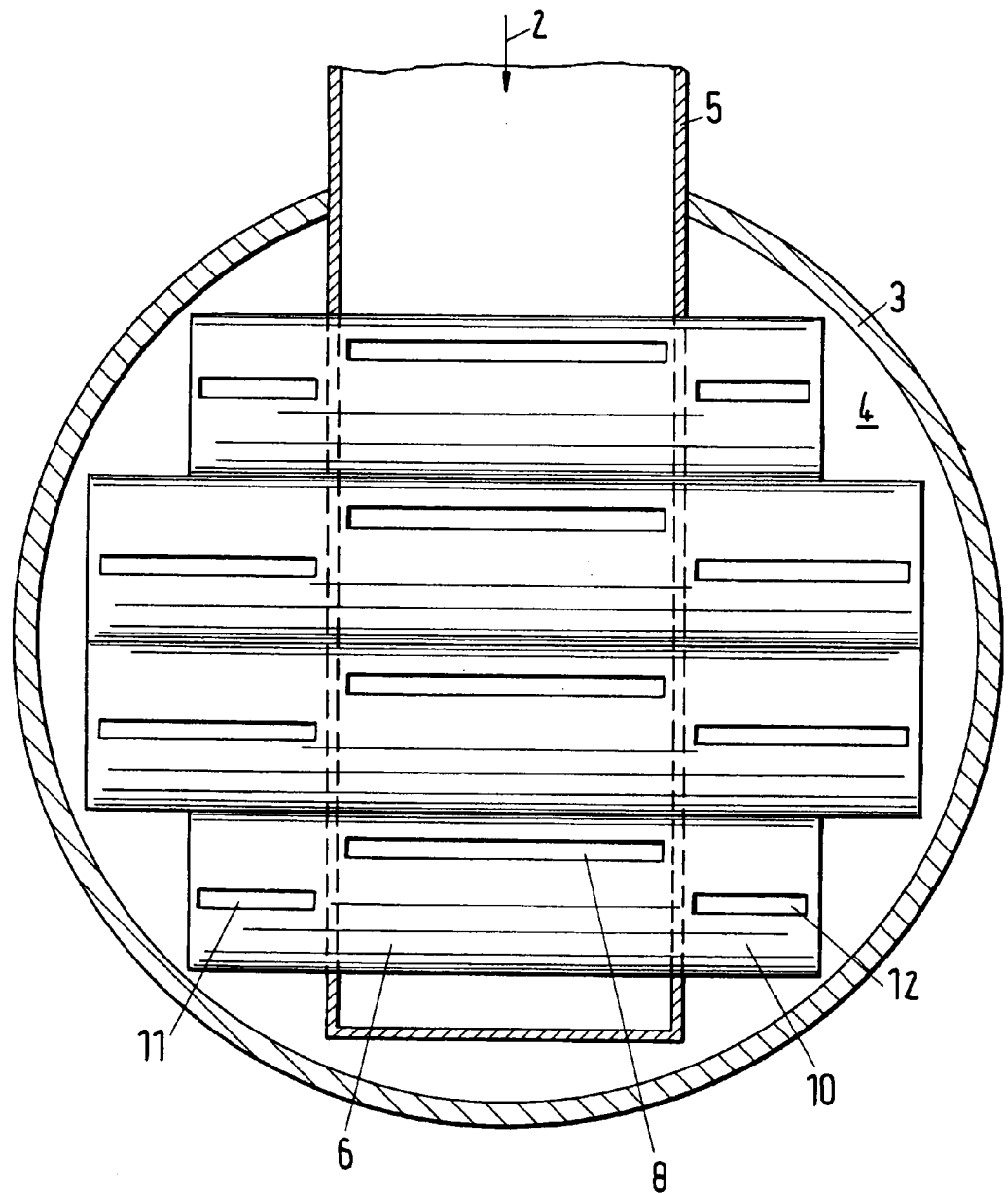
FIG. 2 illustrates a view of the apparatus of FIG. 1 from above.

Referring to FIGS. 1 and 2, the apparatus for the introduction and for the distribution of a fluid 2 into an inner space 4 of a container 3 includes an inlet passage 5 and a plurality of distribution passages 6. The inlet passage 5 is connected outside the container 3 to a passage (not shown) for the supply of a fluid 2. Alternatively to this, the passage can also extend into the inner space of the container 3.

The inlet passage 5 opens into each distribution passage 6 via at least one opening 8 in the upper surface of he respective distribution passage 6 so that the fluid 2 can be guided from the inlet passage 5 into the respective distribution passage 6. As shown, the inlet opening 8 is centrally located in each distribution passage 6.

Each distribution passage 6 is formed of a cylindrical jacket 10, as shown, which has at least one outlet opening 11, 12 in the upper surface.

The distribution passages 6 serve for the distribution of the fluid 2 in the container 3. The fluid 2 moves through the inlet passage 5 through the inlet openings 8 into the distribution passages 6. Each of the distribution passages 6 contains at least one such opening 8. The fluid 2 is, as a rule, a gas in which a liquid is distributed in the form of droplets. The inlet opening 8 is arranged such that the fluid enters into the distribution passage 6 tangentially to the opening 8 so that a rotational flow can be generated in the inner space of the distribution passage 6. The fluid 2 flows in the interior of each distribution passage 6 up to the outlet openings 11, 12 which are arranged, in FIG. 1, symmetrically to a plane which contains the longitudinal axis of the container 3 and the longitudinal axis of the centrally arranged inlet passage 5. The outlet openings 11, 12 are made as breakthroughs 15 in the jacket 10 of the distribution passage 6.

Each distribution passage 6 has a head end 18 and a foot end 19 which are at least partly closed so that the fluid 2 can only exit through the outlet openings 11, 12.

Figure 3:
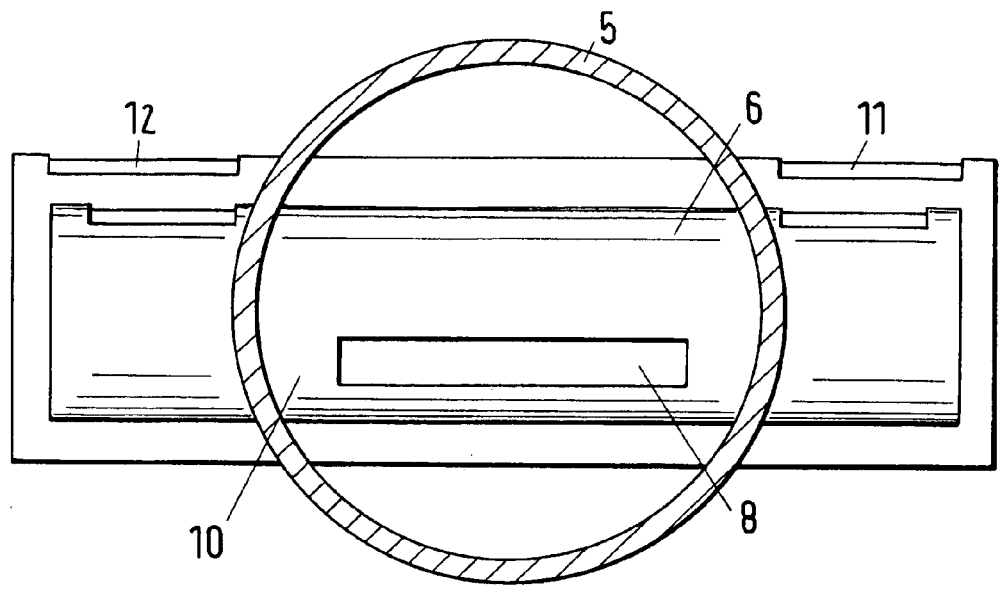
FIG. 3 illustrates a view of a modified fluid inlet apparatus in accordance with the invention in the direction of the inlet passage.

FIG. 1 shows a plurality of distribution passages 6 in parallel with each other. These distribution passages 6 differ from one another in their lengths and can also have different diameters as shown in FIG. 3. The arrangement of the distribution passages 6 in the container 3 is such that a portion of the cross-sectional surface of the container 3 which is as large as possible is covered by the distribution passages 6.

Referring to FIG. 2, the inlet openings 8 as well as the outlet openings 11,12 are located in the upper half of the distribution passages 6. In addition, the distribution passages 6 lie adjacent to one another so that is no spacing provided between neighboring distribution passages 6. In accordance with an alternative embodiment, spacings can also be provided between neighboring distribution passages 6.

Referring to FIG. 3, wherein like reference characters indicate like parts as above, the inlet passage 5 has a cylindrical cross-section of an inside diameter that is larger than the diameter of the distribution passages 6 so that the fluid from the inlet passage 5 can flow above and below the distribution passage 6. It is hereby ensured that the fluid reaches all distribution passages 6. The second embodiment only differs from the first embodiment in that the diameter of the distribution passages 6 differs. The opening 8 is furthermore arranged in the lower half of the jacket 10.

Figure 4:
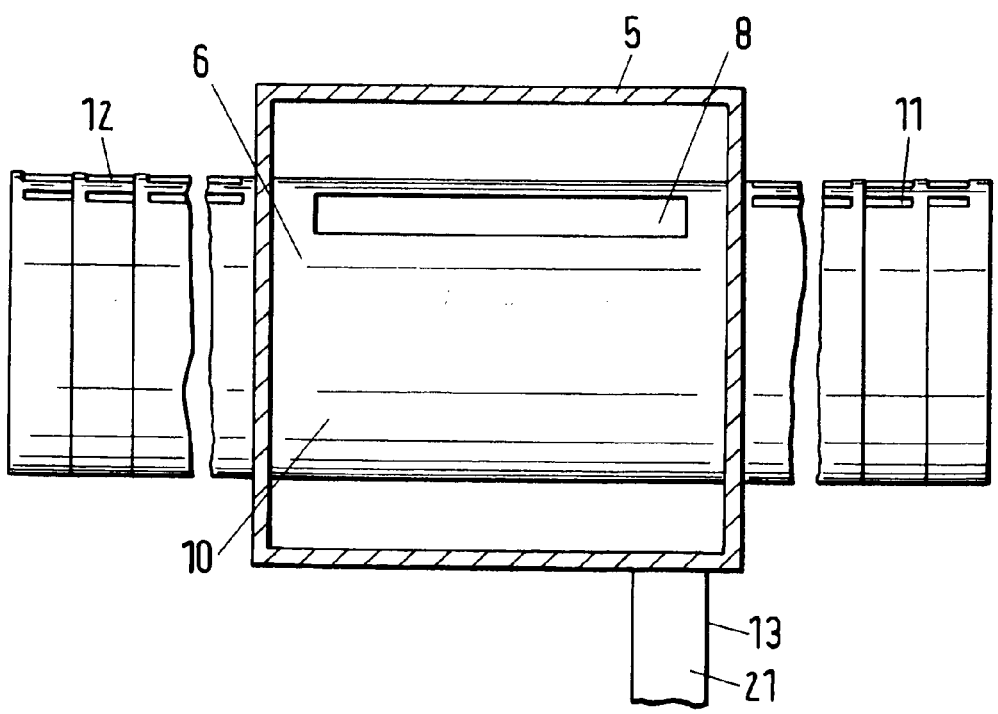
FIG. 4 illustrates a view of a third embodiment of a fluid inlet apparatus in accordance with the invention in the direction of the inlet passage.

Referring to FIG. 4, wherein like reference characters indicate like parts as above, the inlet passage 5 is box-shaped in cross-section and the inlet opening 8 is furthermore arranged in the lower half of the jacket 10. It is also possible to arrange openings 8 above and below the jacket 10, which is not shown graphically.

Figure 5:
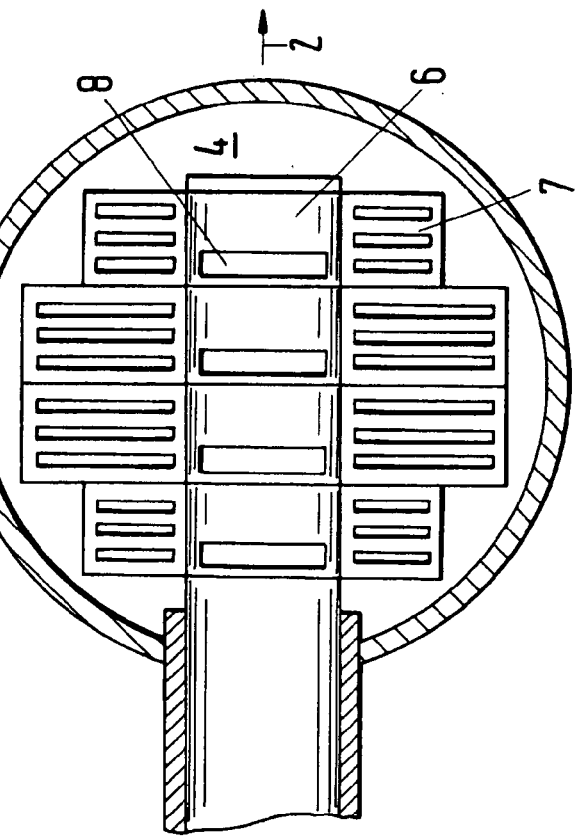
FIG. 5 illustrates a plan view of a fourth embodiment of a fluid inlet apparatus in a container in accordance with the invention.

Referring to FIG. 5, wherein like reference characters indicate like parts as above, each distribution 6 may also be provided with a plurality of outlet openings 11, 12 arranged on each side of each distribution passage 6. The outlet openings can naturally also have a different arrangement; they can, for example, be arranged offset to one another; they can also be made as holes so that the upper side of the jacket 10 is formed in the manner of a perforated metal sheet, which is not shown graphically. The outlet openings furthermore also do not have to be arranged parallel to one another. The length and/or width of each outlet opening can also be variable.

Figure 6:
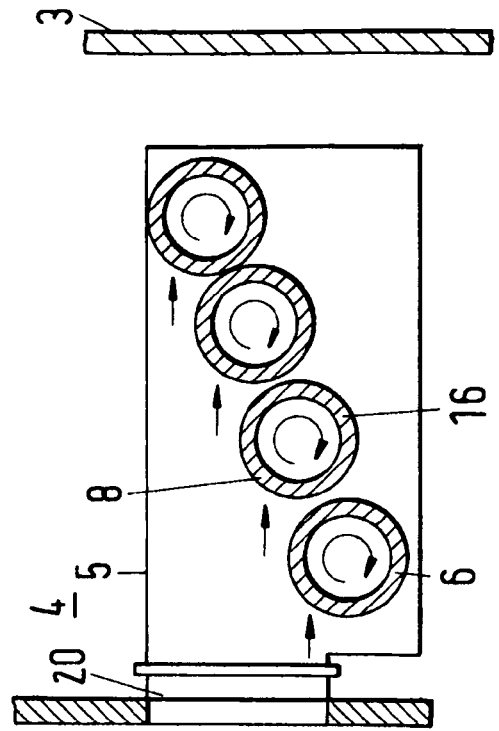
FIG. 6 illustrates a side view of a fifth embodiment of a fluid inlet apparatus in a container in accordance with the invention.

Referring to FIG. 6, wherein like reference characters indicate like parts above, the distribution passages 6 may also be arranged to be offset to one another, that is, at different heights. The distribution passage which is closest to the inlet opening 20 to the container 3 adopts the lowest position; each subsequent distribution passage 6 adopts a higher position than the preceding distribution passage. This arrangement is advantageous when the openings 8 are arranged in the upper half of the jacket 10. In this case, the flow of the fluid toward each of the openings is without hindrance. The distribution passages 6 are shown in sectional form in this side view. The inlet passage 5 is only shown schematically; being cut away in the region of the distribution passages so that the openings 8 of the distribution passages 6 are visible.

Figure 7A:
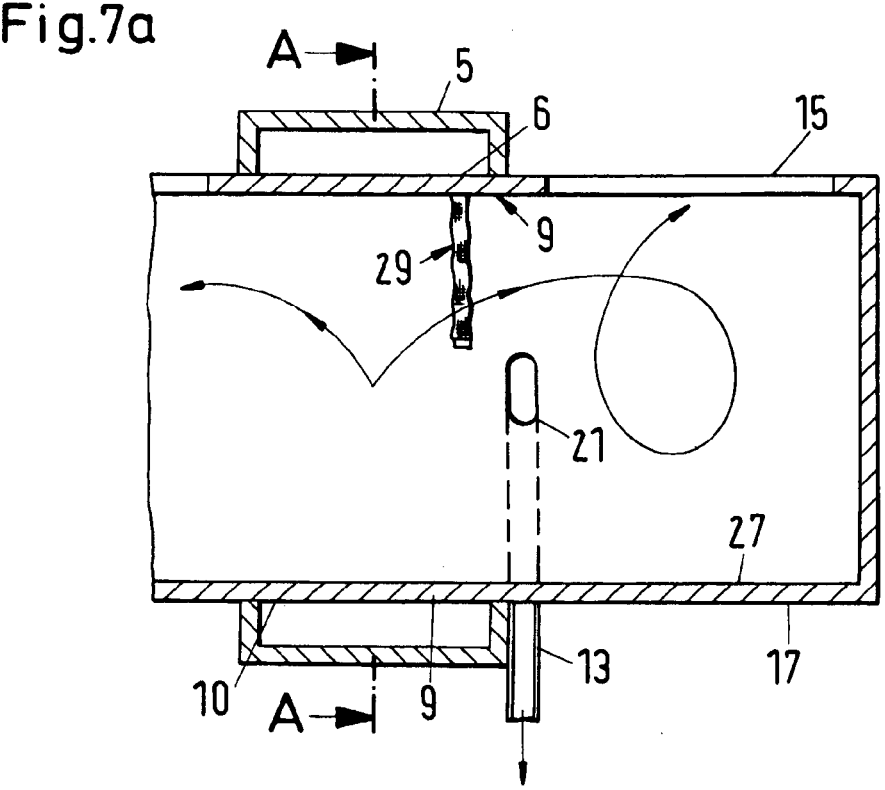
FIG. 7a illustrates a section through the apparatus in accordance with FIG. 1.

Referring to FIG. 7a, the apparatus of FIG. 1 may be constructed to impart a rotational flow to the fluid entering into each distribution passage. To this end, FIG. 7a is sectioned so that the opening 8 lies in front of the sectional plane and is therefore not visible. The fluid 2 passes through the opening 8 in the manner shown in FIG. 7b and is deflected by the jacket 10 so that a rotational flow arises. The rotational flow also has an axial component as indicated in FIG. 7a, so that the fluid is guided, starting from the opening 8, in the directions of the outlet openings 11, 12. A portion of the liquid cannot follow the rotational movement and is deposited at the inner wall 27 of the jacket 10. The liquid flows along the inner wall up to a liquid outlet opening 21 which opens into a liquid collection element 13 located outside the jacket 17 of the distribution passage 6. The liquid collection element 13 can also be arranged within the inlet passage 5.

A preseparation element 29 can furthermore be arranged upstream of the liquid collection element 13. This preseparation element 29 can, in particular, be arranged in the distribution passage 6. In accordance with the embodiment shown in FIG. 7a, the preseparation element 29 is a structure containing hollow spaces such as a screen, a knitted material, a woven material or a felt-like structure, which extends over at least a part of the cross-sectional surface of the tube element 9.

Figure 7B:
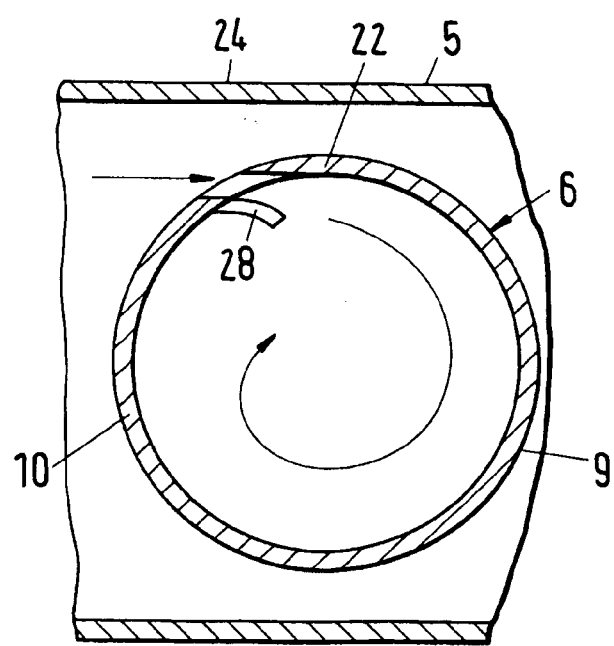

Referring to FIG. 7b, the inlet opening 8 is located in the upper half of the distribution passage 6 and is arranged as close as possible to the point 22 of the distribution passage 6 disposed closest to the top 24 of the inlet passage 5. The flow direction of the fluid 2 therefore corresponds at this position substantially to the direction of the tangent which is horizontal in this representation. The fluid enters into the distribution passage 6 tangentially to the opening 8 for this reason. The opening 8 can furthermore have a guide element 28 in the form of a tab. The guide element 28 is formed from the wall part of the tube element 9 which is cut out or stamped out of the tube element 9 for the manufacture of the opening 8. The wall part is accordingly only cut at 3 parts so that a tab is formed. The tab is bent over about the fourth side so that an opening 8 is obtained.

Figure 8A:
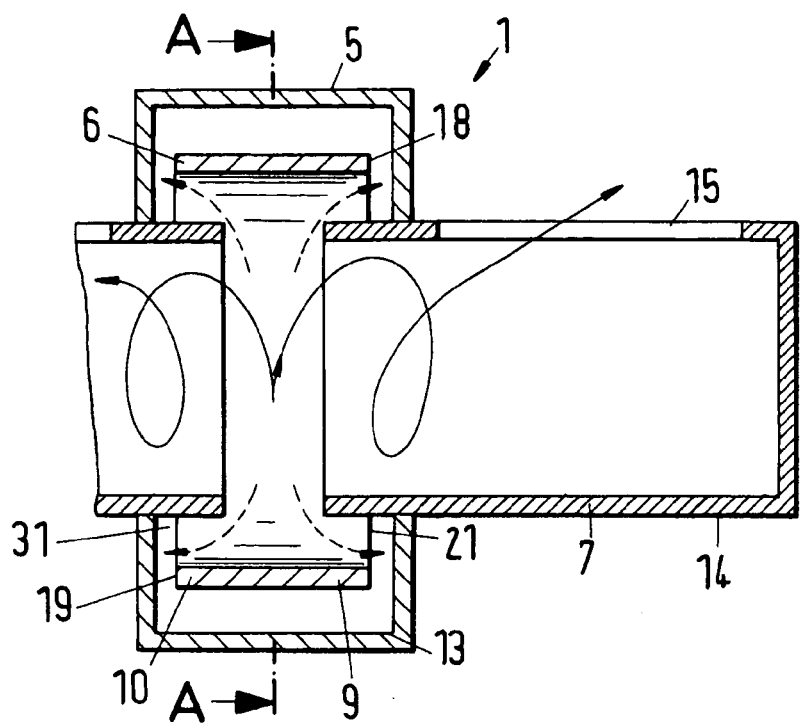
FIG. 8a illustrates a section through a sixth embodiment of a fluid inlet apparatus in accordance with the invention.

Referring to FIG. 8a, the distribution passage 6 may be arranged within the inlet passage 5. In this embodiment, the distribution passage 6 merges into a distribution element 7 which extends outside the inlet passage 5 to a large extent. The distribution element 7 has a jacket 14 which contains at least one breakthrough 15.

The distribution passage 6 likewise has a jacket 10 which contains a head end 18 and a foot end 19. The head end 18 in this case contains the outlet opening 21 and the foot end 19 contains the outlet opening 31. The diameter of the distribution element 7 is accordingly smaller than the diameter of the distribution passage 6. A respective outlet opening 21, 31 each hereby results which is made as a ring-shaped gap. It is also possible that the outlet openings 21, 31 are arranged at the side wall of the inlet passage, which is, however, not shown graphically.

If the outlet opening 21, 31 is arranged within the inlet passage 5, it results as an additional advantage that least some of the liquid in the gas, which has been separated at the inner wall of the jacket 10, can be returned through this outlet opening 21, 31 into the inlet passage. The inlet passage 5 thus takes over the function of the liquid collection element.

Figure 8B:
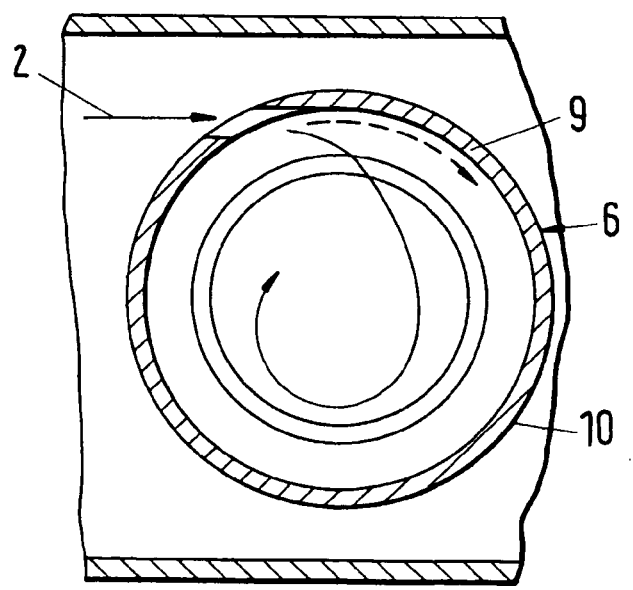

The extent of the fluid flow is also shown in FIG. 8b. The dashed line shows the flow of the liquid. It becomes clear from this that the liquid can follow the rotational movement less easily than the gas flow. The liquid is therefore discharged via the ring gap and moves to the base 25 of the inlet passage 5.

The invention thus provides a fluid inlet apparatus for a container that is able to achieve an improved separation of a fluid into a gas and into a liquid as well as an even distribution of the gas in the container.

What is claimed is:

1. An apparatus for the introduction and for the distribution of a fluid containing gas and liquid into an inner space of a container including
    an inlet passage of predetermined cross-section for conveying a fluid; and
    at least one distribution passage extending across and wholly within said cross-section of said inlet passage for receiving fluid from said inlet passage, said distribution passage having at least one inlet opening communicating with said inlet passage to receive a flow of fluid therefrom and at least one outlet opening for an outflow of gas separated from said flow of fluid, said inlet opening being disposed to direct said flow of fluid tangentially to said inlet opening to generate a rotational flow of said flow of fluid in the inner space of said distribution passage.

2. An apparatus in accordance with claim 1 wherein said distribution passage includes an angle greater than 0° and less than 180° to said inlet passage.

3. An apparatus in accordance with claim 1 wherein said distribution passage includes an angle greater than 60° and less than 120° to said inlet passage.

4. An apparatus in accordance with claim 1 wherein said distribution passage is a tube element.

5. An apparatus in accordance with claim 1 further including a guide element within said distribution passage adjacent said inlet opening for guiding said flow of fluid into said distribution passage.

6. An apparatus in accordance with claim 1 wherein said distribution passage is a cylindrical jacket and said inlet opening is arranged in an upper half of said jacket.

7. An apparatus in accordance with claim 1 further including a liquid collection element in communication with said distribution passage for receiving separated liquid.

8. An apparatus in accordance with claim 7 further including a preseparation element disposed in said distribution passage upstream of said liquid collection element.

9. An apparatus in accordance with claim 1 further including at least one distribution element adjoining said distribution passage at said outlet opening thereof for receiving fluid from said distribution passage.

10. An apparatus in accordance with claim 9 wherein said distribution element has a jacket with a breakthrough through which the fluid can be guided into the inner space of the container.

11. An apparatus in accordance with claim 10 wherein said distribution element has a liquid collection element to guide liquid separated at an inner wall of said jacket away to the outside of said jacket.

12. An apparatus in accordance with claim 1 further including a plurality of said distribution passages disposed in parallel and in parallel communication with said inlet passage.

13. An apparatus in accordance with claim 12 wherein plurality of distribution passages are disposed at a different height from each other relative to said inlet passage.

14. In combination,
    a container having an inner space; and
    an apparatus for distributing a fluid containing gas and liquid into said inner space of said container, said apparatus including an inlet passage of predetermined cross-section for conveying the fluid and a plurality of parallel distribution passages extending across and wholly within said cross-section of said inlet passage in parallel communication with said inlet passage for receiving fluid from said inlet passage, each said distribution passage having at least one inlet opening communicating with said inlet passage to receive a flow of fluid therefrom and at least one outlet opening for an outflow of gas separated from said flow of fluid, said inlet opening being disposed to direct said flow of fluid tangentially to said inlet opening to generate a rotational flow of said flow of fluid in the inner space of said distribution passage.

15. An apparatus for the introduction and for the distribution of a fluid containing gas and liquid into an inner space of a container including
    an inlet passage for conveying a fluid;
    at least one distribution passage for receiving fluid from said inlet passage, said distribution passage having at least one inlet opening communicating with said inlet passage to receive a flow of fluid therefrom and at least one outlet opening for an outflow of gas separated from said flow of fluid, said inlet opening being disposed to direct said flow of fluid tangentially to said inlet opening to generate a rotational flow of said flow of fluid in the inner space of said distribution passage; and
    a preseparation element disposed in said distribution passage upstream of said liquid collection element.

* * * * *

UNITED STATES PATENT AND TRADEMARK OFFICE
CERTIFICATE OF CORRECTION

Page 1 of 1

PATENT NO.         : 9,101,852 B2
APPLICATION NO.    : 12/927705
DATED              : August 11, 2015
INVENTOR(S)        : Ansor Gäbler et al.

It is certified that error appears in the above-identified patent and that said Letters Patent is hereby corrected as shown below:

Specification

Column 4, lines 21 and 22, "each of the" should be --in each-- line 63, ""he" should be --the--

Column 5, line 33, "is no spacing" should be --no spacing is--

Claims

Column 8, line 17, claim 13, "wherein" should be --wherein a--

Signed and Sealed this
Nineteenth Day of January, 2016

Michelle K. Lee
*Director of the United States Patent and Trademark Office*